US006627047B1

(12) United States Patent
Ijiri et al.

(10) Patent No.: US 6,627,047 B1
(45) Date of Patent: Sep. 30, 2003

(54) METHOD FOR PREVENTING POLYMERIZATION IN THIN-FILM TYPE EVAPORATING DEVICE

(75) Inventors: Yuichi Ijiri, Himeji (JP); Takeshi Nishimura, Himeji (JP); Yukihiro Matsumoto, Kobe (JP)

(73) Assignee: Nippon Shokubai Co., Ltd. (JP)

( * ) Notice: Subject to any disclaimer, the term of this patent is extended or adjusted under 35 U.S.C. 154(b) by 0 days.

(21) Appl. No.: 09/556,754

(22) Filed: Apr. 21, 2000

(30) Foreign Application Priority Data

Apr. 23, 1999 (JP) ............................................ 11-116991

(51) Int. Cl.[7] .............................. B01D 1/22; B01D 3/34; C07C 51/44
(52) U.S. Cl. ............................ 203/49; 159/6.1; 159/6.2; 159/13.1; 159/16.1; 159/49; 203/8; 203/89; 203/DIG. 21; 203/74; 562/600
(58) Field of Search ................................ 203/49, 89, 8, 203/74, DIG. 21; 202/238, 236, 269; 562/600; 165/115; 159/13.1, 6.2, 49, 6.1, 16.1, DIG. 42

(56) References Cited

U.S. PATENT DOCUMENTS

| 2,895,886 A | | 7/1959 | Schneider et al. |
| 3,674,651 A | * | 7/1972 | Otsuki et al. .................. 203/49 |
| 3,678,983 A | * | 7/1972 | Widmer et al. ............. 202/238 |
| 4,065,346 A | | 12/1977 | Evkin et al. |
| 4,110,370 A | * | 8/1978 | Engelbach et al. .. 203/DIG. 21 |
| 4,160,692 A | * | 7/1979 | Mitchell et al. ..... 156/DIG. 15 |
| 4,404,928 A | | 9/1983 | Perot et al. |
| 4,415,407 A | | 11/1983 | Longuet |
| 5,250,151 A | | 10/1993 | Huercanos |
| 5,855,743 A | * | 1/1999 | Herbst et al. ................ 203/100 |
| 5,897,749 A | * | 4/1999 | Kroker et al. ....... 203/DIG. 21 |
| 5,959,148 A | | 9/1999 | Sato et al. |
| 5,968,322 A | * | 10/1999 | Arnoldy et al. ................. 203/8 |
| 6,252,110 B1 | * | 6/2001 | Uemura et al. ............. 562/600 |
| 6,350,352 B2 | * | 2/2002 | Kroker et al. ................ 203/89 |

FOREIGN PATENT DOCUMENTS

| DE | A-3338488 | 5/1984 |
| EP | 0 719 575 A2 | 7/1996 |
| EP | 0 719 575 A3 | 5/1997 |
| EP | 0 887 34 A1 | 12/1998 |
| JP | B-6-53711 | 7/1994 |

OTHER PUBLICATIONS

"Thin–film evaporating device <WFE> and Application for the food industry thereof", Shinko Faudlar News, vol. 19, No. 3, (Jul. 1975).
"Utilization of the WFE thin–film type evaporating device", Shinko Faudlar News, vol. 26, No. 1, (Jan. 1982).
Y. Tozaki, "Smith type thin–film evaporating device", Chemical Engineering, (Jan. 1969), pp. 40–48.

* cited by examiner

Primary Examiner—Virginia Manoharan
(74) Attorney, Agent, or Firm—Mathews, Collins, Shepherd & McKay, P.A.

(57) ABSTRACT

A method is provided for preventing an easily polymerizable substance from being polymerized in a thin-film type evaporating device by supplying a solution of the substance to the evaporating heating surface of the device by the centrifugal force of a stirring rotary shaft, characterized by mixing a distilled vapor of the substance with a molecular oxygen-containing gas and supplying the extracted liquid or a solution having lower viscosity than the extracted liquid to a feed raw material inlet thereby adjusting the quantity of a wetting liquid per unit length of the surface in the range of 0.02–2 $m^3$/mHr. In the evaporation of the substance by the use of the device, a method for preventing the substance from polymerization is provided.

27 Claims, 6 Drawing Sheets

PRIOR ART

METHOD FOR PREVENTING POLYMERIZATION IN THIN-FILM TYPE EVAPORATING DEVICE

BACKGROUND OF THE INVENTION

1. Field of the Invention:

This invention relates to a method for preventing polymerization of an easily polymerizable substance in a thin-film type evaporating device.

2. Description of Related Art:

In the purification, recovery, etc. of an easily polymerizable substance, the polymerization of the easily polymerizable substance during such processes for manufacture of products of this substance by distillation, purification, and recovery constitutes itself a big problem.

In the production process of acrylic acid of high purity by the catalytic gas phase oxidation of propylene, for example, since the crude acrylic acid obtained during the process of separation contains such high boiling impurities as acrylic acid dimer and maleic acid, the practice of additionally incorporating a purifying process and a operating process for purifying the crude acrylic acid by separating and removing the high-boiling impurities has been prevailing. Since the high-boiling impurities so separated contain acrylic acid, the very product aimed at, the practice of recovering the acrylic acid for the sake of effective use has been in vogue. The easily polymerizable substance-containing solution which contains impurities, therefore, has been subjected to the operations of distillation and purification.

The contrivances devoted to the recovery of a product aimed at from the solution entraining high-boiling substances includes a thin-film type evaporating device. The method for purifying an easily polymerizable substance will be described below with reference to FIG. 8A and FIG. 8B which illustrate one mode of the conventional vertical thin-film type evaporating device. For a start, the device mentioned above is provided with a rotary shaft (4) which is disposed on a mechanical seal mounting plate (7) through a mechanical seal part (8) as illustrated in FIG. 8A. Generally, the rotary shaft (4) penetrates the interior of the devices and reaches a bearing part (15) in the lower part of the device. This rotary shaft (4) has a liquid distributor plate (5) connected thereto and is rotated in concert with the operation of the stirring rotary shaft (4). FIG. 8B represents a cross section taken through the line a—a in FIG. 8A. A wiper (18) fixed with a supporting metal (20) and a rotor (17) for retaining a mist separator (26) are set in position through the distribution panel (5) as illustrated in FIG. 8B. When an easily polymerizable substance-containing solution is supplied through a raw material inlet (1), this solution is uniformly distributed to an evaporating heating surface (3) via a notched nozzle connecting the liquid distributor plate (5) by the centrifugal force originating in the operation of the rotary shaft (4). When a jacket (21) provided around the perimeter of the device is heated and the easily polymerizable substance on the evaporating heating surface (3) is consequently gasified, the low-boiling substance is gasified, transferred to the upper part of the device via a mist separator (26), and discharged through a vapor outlet (2). Meanwhile, the high-boiling substance is allowed to descend to the interior of the device and discharged through an extracted liquid outlet (10).

The feed material is moved from the liquid distributor plate (5) of the thin-film type evaporating device to the evaporating heating surface (3) and is spread out with a wiper (18) to form a very thin uniform liquid film. Since the liquid under treatment consequently has a short retention time and evaporates at a low temperature, the device is capable of evaporating a thermally unstable substance. Further, since the device is capable of forming a powerful thin film, it is applicable to a substance which produces a highly viscous residue after concentration and suitable for the distillation of an easily polymerizable substance.

As an approach to the purification of an alkyl aminoalkyl ester of acrylic acid or methacrylic acid, the official gazette of JP-B-06-53,711, for example, discloses a method for purification which comprises forming a thin film 0.2–2 mm in thickness and evaporating the ester through the thin film with an average retention time in the range of 2–40 seconds. The official gazette of JP-A-11-12,222 also discloses a method for recovering acrylic acid from an acrylic acid solution containing a high-boiling substance of high viscosity by the use of a recovering column which is provided with a thin-film type evaporating device.

Acrylic acid or methacrylic acid, however, is liable to polymerize at a high temperature. The polymerization not only decreases the quantity of purified acrylic acid or methacrylic acid to be obtained as a product but also entails serious problems such as solidification of a polymer in the evaporating device, for example. This polymerization tends to occur in the portion of the thin-film type evaporating device in which the viscosity is particularly high. Generally, the distillation of acrylic acid is carried out in vacuum of a high degree at the lowest permissible temperature such as not higher than 100° C. for the purpose of preventing the polymerization, with a polymerization inhibitor such as phenothiazine or hydroquinone added to the distillation system. Since the boiling point of such a polymerization inhibitor is invariably higher than the boiling point of acrylic acid, consequently, the acrylic acid gas fails to include the polymerization inhibitor and the polymerization is not easily inhibited fully satisfactorily.

Further, the thin-film type evaporating device has a structural problem. Specifically, while the feed raw material is supplied to the evaporating heating surface (3) by the centrifugal force of the liquid distributor plate (5) annexed to the stirring rotary shaft (4) and subjected thereon to thermal distillation, the rotary shaft (4) is constantly kept in rotation during the operation of the device. This rotary shaft (4) penetrates the interior of the thin-film type evaporating device and connects with the rotary shaft driving part (9) disposed in the upper part of the device. The device is provided therein, for the sake of watertightness, with a mechanical seal (8) adapted for the rotary shaft. Though the mechanical seal (8) is one contrivance for preventing leakage of the vapor of distillation and, at the same time, keeping the motion of the rotary shaft (4) from obstruction, the vapor of distillation of an easily polymerizable substance is liable to adhere to the rotating part of the rotary shaft, forms a deposit of the polymer of the substance thereon, and consequently obstructs the rotation of the rotary shaft. The polymerization which is induced by the rotation of the rotary shaft (4) occurs also on the bearing part (15) in the device. Especially, at the extracted liquid outlet (10), the polymerization is liable to occur because the viscosity of the liquid in process is at a higher level than the feed raw material. Moreover, the extracted liquid outlet (10) tends to suffer adhesion thereto of the condensate liquid of high viscosity and entail stagnation of the extracted liquid in the lower part thereof. Once such adhesion of the polymer arises, the polymer obstructs the rotation of the stirring rotary shaft (4) and forms the cause for stopping the operation of distillation itself and the cause for decreasing the quantity of a product. As a result, the thin-film type evaporating device requires the interior thereof to be washed periodically and consequently puts an obstruction in the way of its lasting stable operation.

The thin-film type evaporating device can be used as connected to a distillation column or a recovering column. The use of this device in this manner may possibly arise in case of using the device as a re-boiler for reboiling the liquid extracted from a recovering column and, at the same time, supplying the vapor formed of a distillate component to the recovering column with the object of recovering an easily polymerizable substance aimed at through the top of the recovering column and, at the same time, circulating the liquid extracted through the bottom of the recovering column back to the thin-film type evaporating device. When the liquid extracted from the recovering column is used as the feed raw material to the thin-film type evaporating device, the wiper (18) will possibly seize on the evaporating heating surface (3) and induce the liquid under treatment to polymerize owing to an increase in the viscosity thereof. If this polymerization occurs, acquisition of a distillate component or condensate liquid having relevant components in fixed concentrations will become difficult and manufacture of a stable product will be obstructed.

SUMMARY OF THE INVENTION

The present inventors have discovered that polymerization arising in a thin-film type evaporating device can be effectively prevented by cyclically using a liquid extracted from the thin-film type evaporating device simultaneously with supplying a molecular oxygen-containing gas and adjusting the quantity of liquid per unit length of the evaporating heating surface of the device in the specific range. This invention has been established by the studies as a result. To be specific, this invention has the object of providing the following items (1) and (2).

(1) A method for preventing an easily polymerizable substance from being polymerized in a thin-film type evaporating device by supplying a solution of said easily polymerizable substance to the evaporating heating surface of said device by the centrifugal force of a stirring rotary shaft, characterized by mixing the vapor of distilled vapor of the substance with a molecular oxygen-containing gas and supplying the extracted liquid obtained from the bottom of the device or a solution having lower viscosity than said extracted liquid to a feed raw material inlet thereby adjusting the quantity of a wetting liquid per unit length of the evaporating heating surface in the range of 0.02–2 $m^3$/mHr.

(2) A method for effecting heat exchange on an easily polymerizable substance by supplying the distillate component at the vapor outlet to the recovering column disposed in the upper part of the thin-film type evaporating device and, at the same time, using at least part of the extract liquid of the recovering column as the feed raw material for the thin-film type evaporating device, characterized by disposing a liquid sealing part utilizing the extracted liquid of the recovering column in part of the pipe interconnecting the extract outlet of the recovering column and the thin-film type evaporating device or supplying the extracted liquid of the recovering column under pressure to the thin-film type evaporating device.

DESCRIPTION OF PREFERRED EMBODIMENT

(1) Easily Polymerizable Substance

Figures 1A, 1B:
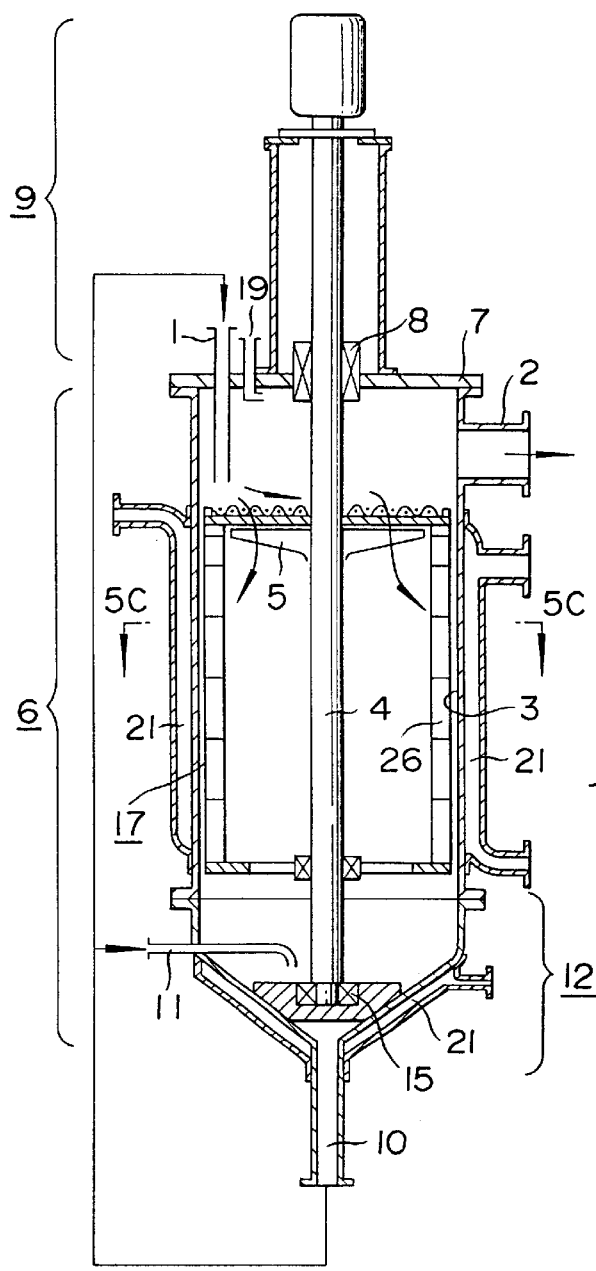
FIG. 1A is a partial cross section illustrating a thin-film type evaporating device according to this invention and FIG. 1B is an explanatory diagram of the interior of the device.

This invention concerns a method for preventing an easily polymerizable substance from being polymerized in a thin-film type evaporating device by supplying a solution of said easily polymerizable substance to the evaporating heating surface of said device by the centrifugal force of a stirring rotary shaft, characterized by mixing the vapor of distilled vapor of the substance with a molecular oxygen-containing gas and supplying the extracted liquid obtained from the bottom of the device or a solution having lower viscosity than said extracted liquid to a feed raw material inlet thereby adjusting the quantity of the wetting liquid or the solution per unit length of the evaporating heating surface in the range of 0.02–2 $m^3$/mHr.

A wide range of polymerizing monomers answer the description "easily polymerizable substance" used in this invention. As concrete examples of the polymerizing monomer, acrylic acid, methacrylic acid, maleic anhydride, styrene, acrylonitrile, and esters thereof, and derivatives thereof may be cited. They may further contain high-boiling substances, solvents, and mixtures of easily polymerizable substances with by-products occurring during the formation thereof. As particularly preferable easily polymerizable substances, acrylic acid and esters (methyl ester, ethyl ester, butyl ester, and 2-ethylhexyl ester) of acrylic acid, methacrylic acid and esters (methyl ester, ethyl ester, propyl ester, isopropyl ester, tertiary butyl ester, and cyclohexyl ester) of methacrylic acid, dimethylaminoethyl (meth)acrylate, and hydroxyalkyl (meth)acrylate may be cited. Optionally, they may contain solvents and other impurities.

In the process which is aimed at purifying acrylic acid and an acrylic ester, for example, the acrylic acid solution which contains an acrylic acid dimer, maleic acid, and other impurities may be cited as easily polymerizable substances in addition to acrylic acid in the bottoms obtained from the high-boiling impurity separating column. Then, in the case of methacrylic acid and methacrylates, for example, the mixture of methacrolein, acrylic acid, and acetic acid which is by-produced during the reaction of catalytic gas phase oxidation of methacrylic acid may be cited as an easily polymerizable substance in addition to methacrylic acid.

(2) Quantity of Wetting Liquid Per Unit Length of Evaporating Heating Surface This invention is characterized by supplying the extracted liquid from the liquid receiving part to the feed raw material inlet in such a manner that the quantity of a wetting liquid per unit length of the evaporating heating surface is in the range of 0.02–2 $m^3$/Hr. The expression "quantity of wetting liquid per unit length of the evaporating heating surface" as used in this invention means the numerical value obtained by dividing the quantity of the wetting liquid extracted from the thin-film type evaporating device by the unit length of the wetted side as represented by the following equation.

Quantity of wetting liquid per unit length of the evaporating heating surface ($m^3$/mHr)=[Quantity of liquid extracted from thin-film type evaporating device ($m^3$/mHr)/[$\pi$×Inside diameter of evaporating heating surface of thin-film type evaporating device (m)]

When the raw material is supplied from a raw material inlet (1) of the thin-film type evaporating device as illustrated in FIG. 1, the feed raw material is gradually evaporated in accordance as it advances on an evaporating heating surface (3) in the device toward an extracted liquid outlet (10). The thickness of the film of the raw material on the evaporating heating surface (3), therefore, is different in the neighborhood of the raw material inlet (1) and in the neighborhood of the outlet (10) on the evaporating heating surface. Particularly, the raw material tends to stagnate or polymerize unless the neighborhood of the outlet of the evaporating heating surface (3) incurring rise of viscosity secures the wetting liquid in a fixed quantity. The quantity of the wetting liquid at varying points of the evaporating heating surface of the thin-film type evaporating device is varied by the length of the evaporating heating surface, the heating temperature, the quantity of the raw material to be fed, the boiling point and the concentration of the easily polymerizable substance, etc. The present inventors have discovered that when the easily polymerizable substance mentioned above is used as the raw material feeding liquid, the polymerization of the easily polymerizable substance during the distillation thereof in the thin-film type evaporating device can be inhibited by supplying at least part of the extracted liquid to the raw material inlet (1) thereby securing the aforementioned quantity of the wetting liquid on the evaporating heating surface (3) throughout the entire length of the evaporating heating surface (3) and, at the same time, supplying a molecular oxygen-containing gas.

When the extracted liquid in its unmodified form is not fit for the recirculation or when the extracted liquid alone is not sufficient for securing the aforementioned quantity of wetting liquid, a solution obtained somewhere else may be used. Even when the extracted liquid can be used, the solution obtained somewhere else may be used for the purpose of addition to the raw material to be fed. When the extracted liquid cannot be used in its unmodified form but it is made by a treatment of some sort usable for the recirculation, the treated liquid may be used as the extracted liquid. When the extracted liquid contains such a high-boiling substance as the dimer of an easily polymerizable substance, for example, this liquid can be adapted for the recirculation and consequently enabled to enhance the yield of purification by thermally decomposing the dimer and converting it into an easily polymerizable substance aimed at.

The present invention adopts the quantity of the liquid ($m^3$/Hr) extracted from the thin-film type evaporating device as the criterion for judgment with the object of securing a fixed quantity of the wetting liquid also on the evaporating heating surface in the neighborhood of the extracted liquid outlet (10) in the thin-film type evaporating device. On the criterion of the quantity of the raw material to be supplied, the evaporating heating surface (3) of the thin-film type evaporating device brings dryness on the extracted liquid outlet side thereof and constitutes itself a cause for inducing polymerization, depending on the magnitude of the amount of evaporation. The speed of evaporation and the quantity of evaporation are varied and the thickness of the film is varied by the difference in the content of the easily polymerizable substance in the raw material to be supplied and the difference in the heating temperature and the vapor pressure. In this invention, the quantity of the wetting liquid can be easily adjusted and the polymerization can be prevented by adjusting the quantity of the extracted liquid to be circulated within the range mentioned above.

In the present invention, the quantity of the wetting liquid on the evaporating heating surface (3) of the thin-film type evaporating device is required to be in the range of 0.02–2 $m^3$/mHr. If the quantity of the wetting liquid exceeds 2 $m^3$/mHr, the liquid will emit a splash, induce polymerization in the pipe, and cause clogging of the pipe. Conversely, if the quantity of the wetting liquid is less than 0.02 $m^3$/mHr, the interior of the thin-film type evaporating device will be liable to dry on the surface and induce polymerization. The thin-film type evaporating device to be effectively used in this invention allows both the vertical and the horizontal type in structure. So long as the range mentioned above is satisfied, the device is not discriminated on account of the difference between the vertical type and the horizontal type. In the vertical type, the range is preferred to be 0.3–1.5 $m^3$/mHr. In the horizontal type, it is preferred to be 0.02–1 $m^3$/mHr because the liquid is liable to emit a splash.

The quantity of the wetting liquid varies even with the kind of the easily polymerizable substance. When the easily polymerizable substance is (meth)acrylic acid and/or a (meth)acrylic ester, the quantity of the wetting liquid is preferred to be in the range of 0.2–2 $m^3$/mHr. This specific range is effective in preventing polymerization because the evaporating heating surface is enabled to form a uniform liquid film in a relatively short period of time and prevented from easily drying.

According to the equation regarding the quantity of the wetting liquid proper for this invention, even in the thin-film type evaporating device having a fixed surface area and supplying the raw material in a fixed quantity, the quantity of the wetting liquid is variable. In the process for purification of an easily polymerizable substance, it is usual to adjust the quantity of the extracted liquid after the thin-film type evaporating device to be used has been set. This invention, in respect that the quantity of the wetting liquid varies with the inside diameter of the evaporating heating surface of the thin-film type evaporating device, enables a thin-film type evaporating device capable of handling the wetting liquid in a quantity specified above to be selected in conformity with the process and consequently prevents polymerization which possibly occurs in the device.

As a heat transfer medium, the thin-film type evaporating device can use steam, oil, etc. though not exclusively. The temperature of this heat transfer medium is preferably not higher than 200° C., and more preferably not higher than 180° C. If the temperature of the heat transfer medium is high, though this high temperature will prove favorable from the viewpoint of the quantity of the wetting liquid as by increasing the difference in temperature between the heat transfer medium and the raw material to be supplied and decreasing the evaporating heating surface and the inside diameter of the evaporating device, it will be at a disadvantage in possibly causing the raw material to succumb to polymerization owing to the increase in the temperature of the evaporating heating surface. Incidentally, the supply of the easily polymerizable substance to the stirring thin-film type evaporating device is not started until the external cylinder of the device is heated with a heat transfer medium. Empirically, it has been known that the speed of thermal decomposition or thermal polymerization of a substance is doubled for each rise of temperature by 10° C. and that it is in direct proportion to the length of the heating time. The temperature inside the external cylinder of the stirring thin-film type evaporating device, therefore, is preferred from the viewpoint of preventing polymerization to fall in the lower portion of the range of temperature specified for quick distillation of the easily polymerizable substance to be supplied. In the range mentioned above, this temperature is higher preferably by 5–80° C., more preferably by 20–50° C., than the boiling point of the easily polymerizable substance under the pressure of distillation.

(3) Molecular Oxygen-Containing Gas

This invention is characterized by performing the aforementioned adjustment of the quantity of the wetting liquid simultaneously with the supply of the molecular oxygen-containing gas into the thin-film type evaporating device. Generally, the polymerization of an easily polymerizable substance is inhibited by adding a varying polymerization inhibitor such as phenothiazine to the substance during the course of the process. The polymerization inhibitor, however, cannot exist in the gas phase resulting from the evaporation of the easily polymerizable substance because it is a high-boiling substance. When the raw material supplying liquid contains a polymerizable substance, therefore, the polymerization thereof cannot be inhibited fully satisfactorily. Thus, the molecular oxygen-containing gas which possesses an effect of inhibiting polymerization is supplied with the object of inhibiting the polymerization.

In this invention, the molecular oxygen-containing gas can be used as a polymerization inhibitor in a form added to the polymerization inhibitor mentioned above or in an independent form. As the molecular oxygen-containing gas, air can be used besides oxygen gas. Properly, the quantity of the molecular oxygen-containing gas to be supplied (where the gas contains a component other than oxygen gas, as reduced to oxygen gas) is in the range of 0.01–5 vol. %, preferably 0.02–3 vol. %, based on the quantity of the vapor of the easily polymerized substance (as reduced to the standard conditions) generated in the thin-film type evaporating device. The expression "quantity of the vapor resulting from evaporation" as used herein means the total quantity of the monomer vapor of the easily polymerizable substance supplied to the thin-film type evaporating device.

The method for supplying the molecular oxygen-containing gas may comprise either directly mixing the gas with the easily polymerizable substance, i.e. the raw material to be fed, as by means of bubbling or indirectly mixing the gas as dissolved in a solvent with the easily polymerizable substance. The molecular oxygen-containing gas, however, is preferred to be supplied into the thin-film type evaporating device through a molecular oxygen-containing gas supplying pipe (14) or a molecular oxygen-containing gas inlet (13) as illustrated in FIG. 1. The site for the supply of this sort is preferred to fall in the periphery part of a mechanical seal (8) of the stirring rotary shaft (4) in the device. The mechanical seal (8) is one kind of contrivance for proofing the stirring rotary shaft (4) against leakage. Since it prevents the leakage by establishing contact between the ring rotating in concert with the shaft and the stationary ring and causing the rings to slide against each other, it produces a nearly perfect airtight watertight closure. Since the interior of the thin-film type evaporating device constantly remains in a heated state and tends to induce adhesion of the distillate component and polymerization thereof, the eventual adhesion of the polymer interferes with smooth rotation of the rotary shaft. By supplying the molecular oxygen-containing gas via the periphery part of the mechanical seal (8), therefore, it is made possible to inhibit the polymerization liable to occur in the portion of the mechanical seal (8). When the molecular oxygen-containing gas is supplied through the molecular oxygen-containing gas supplying pipe (14) which is disposed in the mechanical seal fixing plate (7) as illustrated in FIG. 1, therefore, the gas so supplied prevents the polymerization tending to occur in the periphery part of the mechanical seal (8), though the periphery part mentioned above constitutes itself the site for the presence of the vapor gas of the heated easily polymerizable substance and tends to induce polymerization.

Figure 2A:
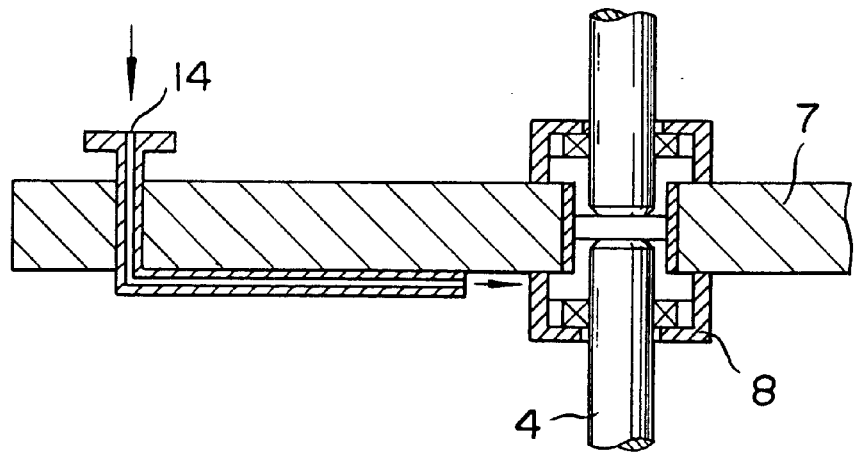
FIG. 2A is a cross section illustrating a molecular oxygen-containing gas supplying pipe disclosed on a mechanical seal fixing plate in the thin-film type evaporating device of the present invention and FIG. 2B is a cross section illustrating a molecular oxygen-containing gas inlet disposed in the mechanical seal fixing plate.
Figure 2B:
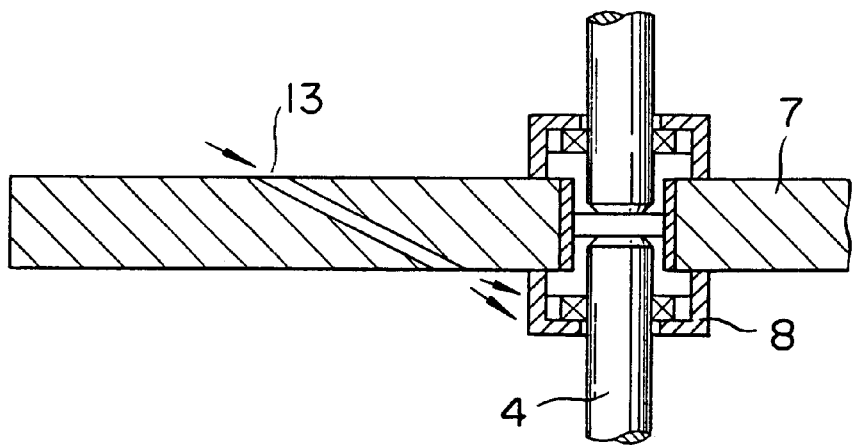

FIG. 2A illustrates one mode of providing the pipe (14) in the mechanical seal fixing plate (7) and FIG. 2B illustrates one mode of disposing the supplying inlet (13). The mode of FIG. 2A is furnished with the molecular oxygen-containing gas supplying pipe (14) piercing the mechanical seal fixing plate (7) and reaching the periphery part of the mechanical seal (8). The mode of FIG. 2B is not furnished with such a pipe but is provided with the supplying inlet (13) piercing the mechanical seal fixing plate (7) and serving the purpose of supplying the molecular oxygen-containing gas to the periphery part of the mechanical seal (8). In any event, the molecular oxygen-containing gas from an external source is supplied to the neighborhood of the mechanical seal (8) in the device and the gas so supplied is enabled to prevent polymerization from occurring in the mechanical seal part. Incidentally, the number of pipe (14) and supplying inlet (13) does not need to be limited to one but may be two or more as occasion demands. The device may be provided with the supply inlet (14) and the pipe (14) simultaneously. The pipe (1) is at an advantage in allowing the device to be manufactured easily and the supplying inlet (13) is at an advantage in inhibiting adhesion of the polymer resulting from the polymerization of the easily polymerizable substance because the pipes laid in the mechanical seal fixing plate (7) have no undulating part. The piping member may use an ordinary material which is generally used in the thin-film type evaporating device.

In this invention, the destination of the supply of the molecular oxygen-containing gas does not need to be limited to the periphery part of the mechanical seal (8) mentioned above. As a concrete example of the thin-film type evaporating device to which the molecular oxygen-containing gas can be supplied as described above, the known thin-film type evaporating device may be cited which effects the supply of the easily polymerizable substance to itself for the purpose of evaporation therein by means of the centrifugal force of the stirring rotary shaft. This thin-film type evaporating device is provided somewhere in the evaporating part (6) thereof with the molecular oxygen-containing gas supplying inlet (13) or the molecular oxygen-containing gas supplying pipe (14). Further, as illustrated in FIG. 1, this invention designates the portion of the interior of the thin-film type evaporating device possessing the evaporating heating surface (3) as the evaporating part (6), designates the portion forming the terminal part of the evaporating part (6) and extending to the discharge outlet (10) for the extracted liquid as the liquid receiving part (12), and includes the liquid receiving part (12) in part of the evaporating part (6). The thin-film type evaporating device which is possessed of the liquid receiving part (12) as part of the evaporating part (6) is capable of supplying the molecular oxygen-containing gas to the liquid receiving part (12).

Figure 3A:
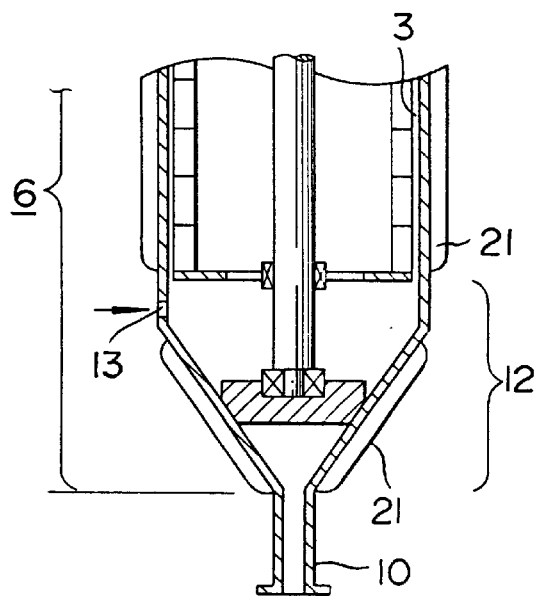
FIG. 3A is a cross section illustrating part of an evaporating part having disposed therein the molecular oxygen-containing gas inlet in the thin-film type evaporating device of the present invention and FIG. 3B is a cross section illustrating part of the evaporating part having disposed therein a molecular oxygen-containing gas supplying pipe.
Figure 3B:
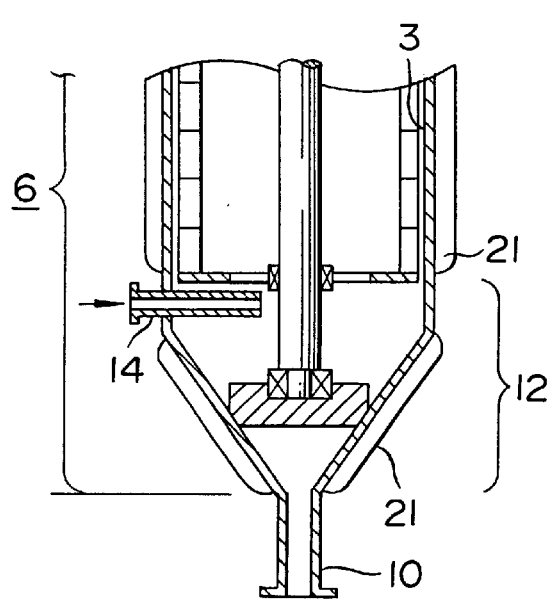

As a concrete example of the liquid receiving part which is provided with molecular oxygen-containing gas supplying pipe (14) in the manner described above, the liquid receiving part (12) which has the molecular oxygen-containing gas supplying pipe pierce the liquid receiving part (12) and reach the interior thereof as illustrated in FIG. 3B may be cited. As a concrete example of the liquid receiving part which is not provided with such a pipe but is provided with the molecular oxygen-containing gas supplying inlet (13), the liquid receiving part (12) which has the supplying inlet (12) for supply of a molecular oxygen-containing gas penetrate through the liquid receiving part (12) as illustrated in FIG. 3A may be cited. Despite the communication between the liquid receiving part (12) and the evaporating heating surface (3) which affords a passage for a gas, the supply of the molecular oxygen-containing gas by the molecular oxygen-containing gas supplying pipe (13) to the central part of the liquid receiving part (12) permits the gas to be easily mixed with the distillate component.

Incidentally, the supplying inlet (13) or the pipe (14) may exist anywhere in the liquid receiving part (12) and is not discriminated on account of location or even quantity. The liquid receiving part (12) is possibly provided on the outside thereof with a heating part with the object of heating the extracted liquid. For the device which is so constructed, it is proper that the supplying inlet (13) or the pipe (14) be disposed anywhere other than the heating part. The quantity of the pipe (13) does not need to be limited to one but may be two or more. The gas supplying inlet (13) and the gas pipe (14), when necessary, may be simultaneously provided. For the sake of this invention, the pipe (13) is preferred to reach in proximity of the central of the liquid receiving part (12). The device which is provided in the periphery part of the mechanical seal (8) with the molecular oxygen-containing gas supplying pipe (14) or the supplying inlet (13) may be additionally provided in the liquid receiving part (12) with the supplying pipe (14) or the supplying inlet (13). The piping member may use a material generally used in the thin-film type evaporating device.

By supplying the molecular oxygen-containing gas in the manner described above in accordance with the method of this invention, it is made possible to inhibit effectively the polymerization of the easily polymerizable substance in the recovering column as when the vapor emanating from the thin-film type evaporating device is supplied to the recovering column.

(4) Extracted Liquid Discharge Outlet

In this invention, the extracted liquid discharge outlet (10) may be supplied with either the extracted liquid or a solution having lower viscosity than the extracted liquid. Generally, since the discharge outlet (10) is covered with a substance of high viscosity, this viscosity itself lowers the flow speed of the extracted liquid, suffers the extracted liquid to stagnate easily in the outlet, and renders difficult the discharge of the extracted liquid from the thin-film type evaporating device. By supplying the extracted liquid also to the extracted liquid discharge outlet (10) and further to the external pipe (not shown) connected to the discharge outlet (10), therefore, it is made possible to increase the flow speed of the extracted liquid in the discharge outlet (10) or the pipe connected thereto and maintain the heat-exchange operation stably. When use of the extracted liquid in its unmodified form proves improper, the solution produced by subjecting the extracted liquid to a specific treatment may be used as the extracted liquid. Besides the extracted liquid, a solution from some other source which has viscosity equal to or higher than the viscosity of the extracted liquid may be used when necessary.

In the thin-film type evaporating device of this invention, the evaporating part (6) includes as part thereof the liquid receiving part (12) which is directed from the lower terminal part of the evaporating heating surface (3) toward the extracted liquid discharge outlet (10). The supply of the extracted liquid to the discharge outlet (10) in the thin-film type evaporating device is accomplished by circulating the extracted liquid from the extracted liquid supplying inlet (10) of the liquid receiving part (12), optionally through the external pipe (11) connected to the supplying inlet (10), to the liquid receiving part (12). This pipe (11) is convenient in respect that it is capable of continuously supplying the extracted liquid to a specific place. When the feed liquid happens to be the extracted liquid, the pipe (11) mentioned above assumes a structure of circulating through the extracted liquid discharging outlet (10) and the liquid receiving part (12) as illustrated in FIG. 1. Incidentally, the method for supplying the solution mentioned above does not need to be limited to the use of the pipe (11) mentioned above but may resort to the spray of the solution in the direction of the outlet (10).

As a concrete example of the structure which is possessed of the solution supplying pipe (11) for supplying the extracted liquid to the discharge outlet (10) mentioned above, the device which is possessed of the molecular oxygen-containing gas supplying pipe (14) and the molecular oxygen-containing gas supplying inlet (13) mentioned above and is further provided in the liquid receiving part (12) thereof with the pipe (11) for supplying the extracted liquid or the solution having lower viscosity than the extracted liquid to the extracted liquid discharging outlet (10) and the extracted liquid supplying inlet (not shown) as illustrated in FIG. 1 may be cited. The solution supplying pipe (11) may be laid through anywhere in the liquid receiving part (12). The quantity of the pipe is irrelevant. The piping member may use a material generally used for the thin-film type evaporating device.

(5) Bearing Part

Figure 4:
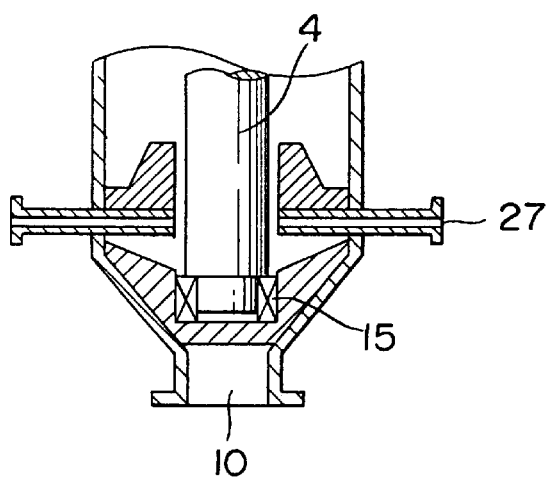
FIG. 4 is a cross section illustrating a lower bearing part of a rotary shaft of the thin-film type evaporating device.

The thin-film type evaporating device to be used in this invention does not necessarily require the stirring rotary shaft (4) built therein to be provided in the lower terminal part thereof with a bearing part. The vertical thin-film type evaporating device of a large size, however, requires itself to be provided in the lower part thereof with a bearing part (15) as illustrated in FIG. 1 or requires an addition to the diameter of the shaft. Since the increase of the diameter of the shaft boosts the cost, the provision of the bearing (15) in the lower part is frequently resorted to. The bearing part (15) in the lower part often gives rise to a polymer. In the vertical thin-film type evaporating device which is possessed of the bearing part (15), therefore, the extracted liquid or the solution having lower viscosity than the extracted liquid is supplied to the bearing part (15) through the bearing part extracted liquid supplying pipe (27) which is laid from outside the device toward the rotary shaft (4) as illustrated in FIG. 4. Generally, in the bearing part (15) of the thin-film type evaporating device, the gap between the stirring rotary shaft (4) and the bearing part (15) is liable to dry because it is held in a heated state. Particularly, the thrust bearing in which the direction of the load to be borne coincides with the axial direction is liable to dry and induce polymerization of an easily polymerizable substance because it manifests a large load bearing force and suffers only small invasion of the extracted liquid. The rotational speed of the stirring rotary shaft (4) is consequently lowered. This invention, therefore, prevents the bearing part (15) from inducing such adverse phenomena as clogging and polymerization by supplying the extracted liquid or the solution of low viscosity to the bearing part (15).

The method for circulating the extracted liquid through such a bearing part (15) may comprise disposing the bearing part extracted liquid supplying pipe (27) as directed toward the bearing part (15) in the evaporating part and using this pipe for supply of the solution. By spraying the solution in the direction of the bearing part (15), it may be made possible to prevent the surface from drying and preclude the occurrence of the drying and polymerization. When the bearing part extracted liquid supplying pipe (27) is not provided but the bearing part (15) is provided in advance with the pipe for supplying lubricating oil thereto, for example, the solution may be supplied through this pipe.

(6) Surface Roughness

In this invention, the thin-film type evaporating device is enabled to exalt the effect thereof further by imparting surface roughness, Ry, specified in JIS (Japanese Industrial Standard) B 0601 (-1994), of not more than 12.5 $\mu$m, preferably not more than 3.2 $\mu$m, to part or whole of the surface of the thin-film type evaporating device which is exposed to an easily polymerizable substance. When an undulation is present on the surface which is exposed to the easily polymerizable substance, the easily polymerizable substance adheres to or stagnates on the uneven portion of the surface. Since no polymerization inhibitor is present particularly in the condensate liquid of the easily polymerizable substance which occurs in the thin-film type evaporating device, the condensate liquid stagnating on a finely unevenness part of the metallic surface is liable to induce polymerization. By depriving the metallic surface of the undulation, therefore, it is made possible to lessen the chance of the easily polymerizable substance for condensation and stagnation and, at the same time, inhibit the polymerization effectively. Since the surface of contact is greatly smoothed, the transfer of the condensate liquid is accelerated. For the purpose of acquiring such surface roughness, such methods of surface treatment as mechanical polishing including buffing and electrolytic polishing are available.

The buffing is a method of polishing which is mainly adopted for obtaining a smooth surface or a glossy surface and is known in such types as coarse buffing with a stationary abradant, medium buffing with a semisolid or free abradant, and finishing buffing.

The buffing may be effected by using such flexible materials as leather and cloth and oily agents, non-oily agents, and spray grade agents containing tripolysilicate stone, chromium oxide, silicon carbide, fused alumina, calcined alumina, and chromium oxide as an abradant.

The electrolytic polishing is a method for smoothing a metallic surface by the action of dissolving. Where the material for the contact surface is iron or steel, perchloric acid solutions, sulfuric acid solutions, phosphoric acid solutions, and sulfuric acid-phosphoric acid solutions may be used for the electrolytic abrasion. Since iron and steel have their textures greatly vary with not only the difference in composition but also the difference in the degree of heat treatment and machining, the abradants mentioned above may be properly selected to suit the surface of contact to be involved. The quantity of acetic anhydride generally added to the perchloric acid type electrolyte, the electrolyzing temperature, the current density, the voltage, the electrolyzing time, etc., therefore, may be properly selected to suit the material of iron and steel. Optionally, the mechanical polishing may be followed by an electrolytic polishing.

In this invention, the contact surface of the easily polymerizable substance ought to be construed as embracing the extracted liquid as an easily polymerizable substance. It is permissible to use the extracted liquid cyclically as the feed raw material.

(7) Welded Part of Extracted Liquid Outlet

The extracted liquid outlet (10) is counted among such surfaces for contact with the easily polymerizable substance as described above. In the thin-film type evaporating device of a construction such that the extracted liquid outlet (10) of a projecting shape is joined thereto by welding, the welded part is preferred to be chamfered. When an unevenness is present on the surface exposed to an easily polymerizable substance, it forms the cause for stagnation of the easily polymerizable substance and consequent adhesion of a polymer as described above. When a corner part is formed in the part for connecting the outlet (10) to the liquid receiving part (12), the polymer is liable to adhere to the corner part. Further, the corner part obstructs the discharge of the extracted liquid. By chamfering the welded part thereby preventing the liquid from stagnating in the lower conical part, therefore, it is made possible to prevent the polymerization. Even the chamfered welded part is preferred to be given a surface roughness, Ry specified in JIS B 0601 (−1994), of not more than 12.5, particularly not more than 3.2.

(8) Wiper

Figure 5A:
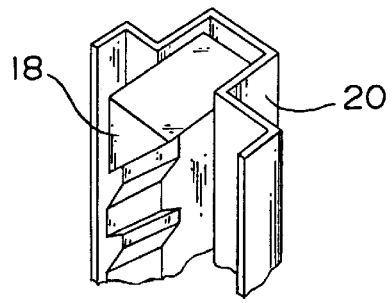
FIG. 5A is a partial perspective view illustrating the manner in which a wiper is fixed to the wiper supporting piece (20), FIG. 5B a partial perspective view illustrating the manner in which a wiper (18) is supported by a movable vane supporting rod (19), FIG. 5C a cross section of the thin-film type evaporating device having disposed therein the wiper in the manner of FIG. 5A, and FIG. 5D a cross section of the thin-film type evaporating device having disposed therein the wiper in the manner of FIG. 5B.
Figure 5B:
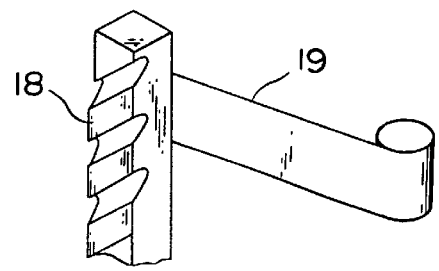
FIG. 5 is a cross section of the thin-film type evaporating device of this invention taken through the line b—b in FIG. 1 (FIG. 5C and FIG. 5D) and a partial diagram illustrating a mechanism for uniformly applying the feed raw material liquid to an evaporating heating surface (FIG. 5A and FIG. 5B)

The thin-film type evaporating device to be used in the present invention does not need to discriminate the construction thereof between the horizontal type and the vertical type. As a wiper (18) for uniformly spreading the raw material supplying liquid on the evaporating heating surface (3), the vertical thin-film type evaporating device is preferred to have the wiper (18) illustrated in FIG. 5B fixed to a rotor (17) through a variable vane supporting rod (19). In the thin-film type evaporating device, the wiper (18) is generally fixed to the periphery part of the rotor (17) connected to beams projected radially from the stirring rotary shaft (4) and this wiper (18) serves the purpose of forming a thin film on the evaporating heating surface (3).

In this invention, the surface pressure of the wiper (18) is preferred to be adjusted by means of the movable vane supporting rod (19).

Figure 5C:
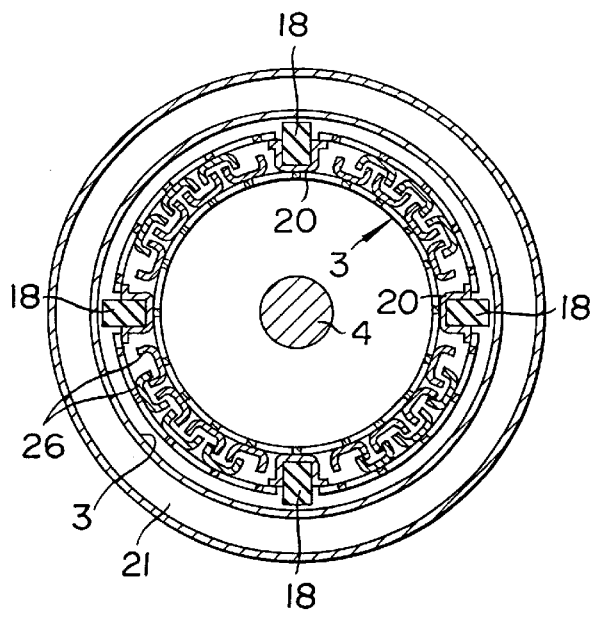
Figure 5D:
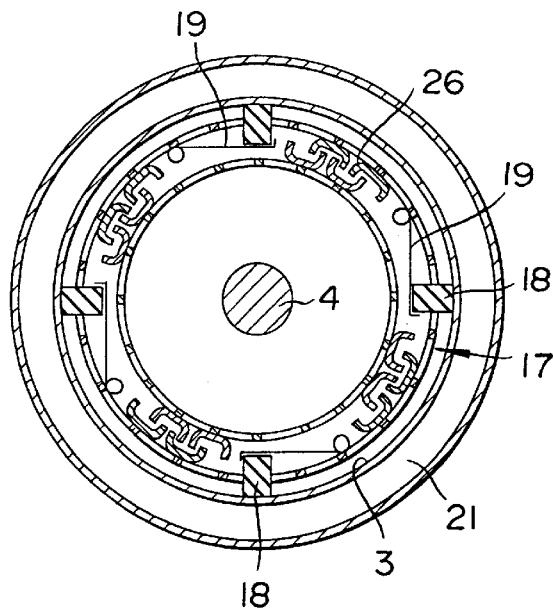

The reason for using the variable vane supporting rod (19) is as follows. Specifically, for the adjustment of the wiper pressure, the method which relies on the centrifugal force and the method which relies on the pressure of the variable vane are available. In the case of the method which effects the adjustment by the centrifugal force through the medium of a wiper supporting metal (20) illustrated in FIG. 5A, there are times when the polymer adheres to the wiper (18). The wiper (18) functions to prevent the liquid under treatment from spattering and, at the same times, scrape and push down highly viscous liquid adhering to the surface. The method which effects the adjustment by the centrifugal force through the supporting metal (20), however, is liable to induce polymerization because the clearance of the supporting metal from the evaporating heating surface (3) is large. In contrast, the method resorting to the variable vane supporting rod (19) is capable of effectively preventing the evaporating heating surface (3) from drying and repressing the adhesion of the polymer to the wiper (18) because the clearance is small. FIG. 5C which is cross sections taken through the line 5c–5c in FIG. 1 compare the case of effecting the adjustment by the centrifugal force through the wiper supporting metal (20) of the wiper (18) and the case of effecting the adjustment by the variable vane supporting rod (19) respectively in terms of the state of attachment of wiper. The adjustment of FIG. 5C resorting to the centrifugal force through the wiper supporting metal (20) of the stirring rotary shaft has the possibility that the speed of formation of the thin film will be lowered when the rotary speed of the rotary shaft is low, whereas the adjustment of FIG. 5D resorting to the variable vane supporting rod (19) is at an advantage in enabling the face pressure to be adjusted with the rotary speed kept intact.

(9) Angle of Cone

Figure 6:
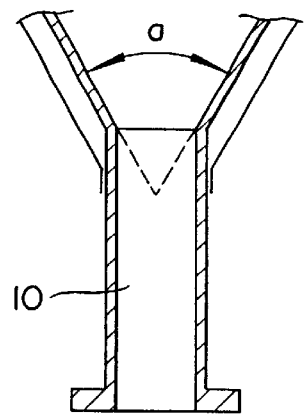
FIG. 6 is a partial cross section illustrating the angle of a conical member in the lower part of the thin-film type evaporating device.

In the vertical thin-film type evaporating device which forms at the lower end thereof a cone converging from the lower terminal part of the device toward the extracted liquid outlet, this invention prefers the so-called cone angle, i.e. the angle between the generating lines of the cone, to be in the range of 40–70°, particularly in the range of 50–70°. If this angle exceeds 70°, the excess will be at a disadvantage in rendering the discharge of the highly viscous substance from the thin-film type evaporating device difficult. If the angle is less than 40°, the shortage will be at a disadvantage in requiring elongation of the lower axial part. FIG. 6 depicts a cone angle (a). This conical part is equivalent to the liquid receiving part (12) mentioned above.

This invention is characterized by circulating the extracted liquid mentioned above to the raw material supplying inlet (1) thereby adjusting the quantity of the wetting liquid in the range of 0.02–2 $m^3$/mHr. It, therefore, is characterized also by the constant presence of a solution in the part forming the cone mentioned above. This solution, however, gains in viscosity in accordance as the evaporating heating surface shifts and the speed of discharge of the solution is lowered particularly in the neighborhood of the cone in consequence of the rise of the viscosity. Further, on the evaporating heating surface (3), the thin film of concentrated liquid is pushed, spread, and discharged in the direction of the outlet by the advancing force of the continuously supplied liquid and the centrifugal action of the liquid distributing plate (5). On the cone mentioned above, the extracted liquid is liable to stagnate in consequence of the rise of viscosity because such centrifugal force is absent. The method of this invention, in the vertical thin-film type evaporating device which forms at the lower end thereof a cone converging from the lower terminal part of the device toward the extracted liquid outlet, prefers the angle formed between the generating line of the cone, to be in the range of 40–70°. Incidentally, the device which is possessed of such an angle cone is allowed to be provided with such supplying pipes as the molecular oxygen-containing gas supplying inlet and the discharge outlet for the liquid receiving part simultaneously.

(10) Downward Gradient

When the horizontal thin-film type evaporating device is used, it is preferred to be installed so that the downward gradient of the evaporating heating surface mentioned above is required to be not less than $\frac{1}{200}$, preferably to be in the range of $\frac{1}{200}$–$\frac{1}{10}$, and particularly preferably to be in the range of $\frac{1}{100}$–$\frac{1}{10}$. In the horizontal thin-film type evaporating device, though the transfer of the condensate liquid toward the outlet (10) by the gravitational force is absent, the rise of the condensate liquid in concentration occurs in the same manner as in the vertical thin-wall type evaporating device as mentioned above. The impartation of the gradient mentioned above, therefore, results in preventing the easily polymerizable substance from stagnating in the interior of the evaporating device.

(11) Extracted Liquid Storage Tank

Figure 7:
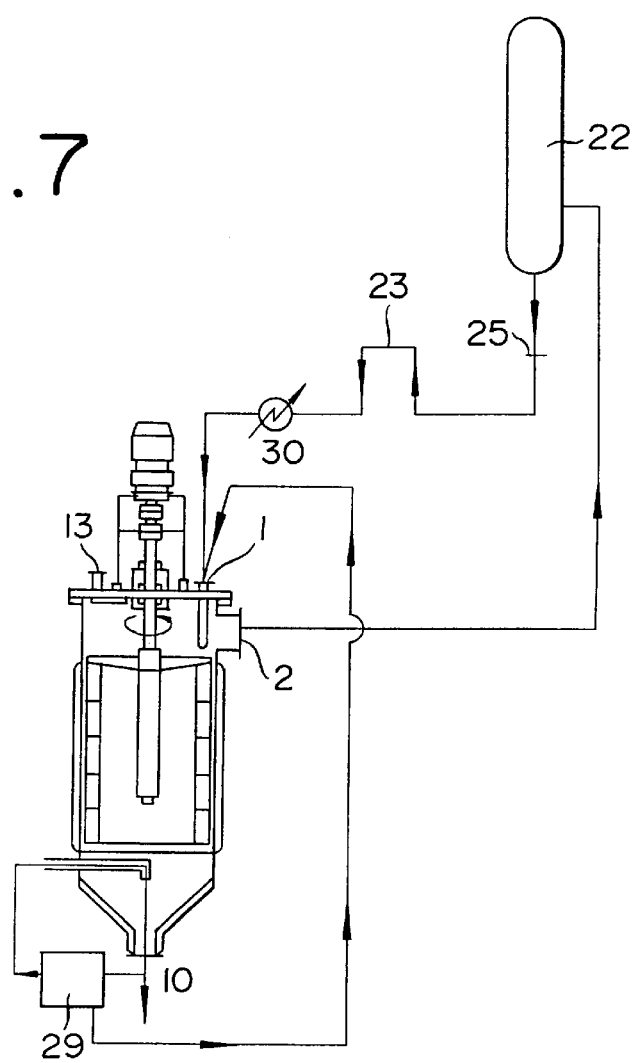
FIG. 7 is a layout drawing illustrating a recovering column disposed in the upper part of the thin-film type evaporating device and provided with a liquid sealing part.
Figure 8A:
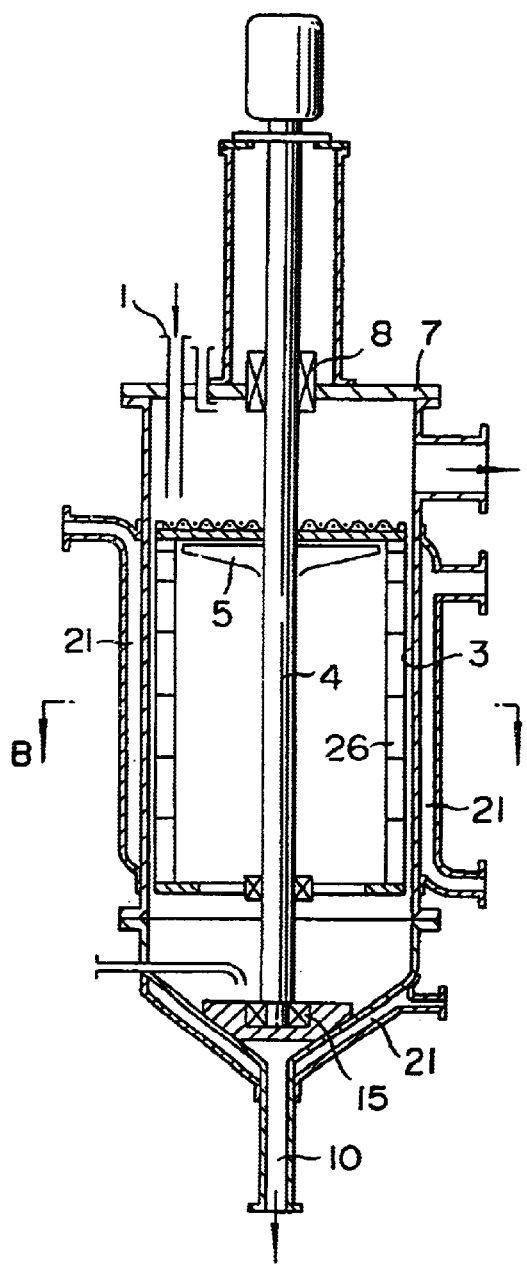
FIG. 8A is a partial cross section illustrating the conventional thin-film type evaporating device and FIG. 8B is a cross section taken through the line a—a in FIG. 8A.
Figure 8B:
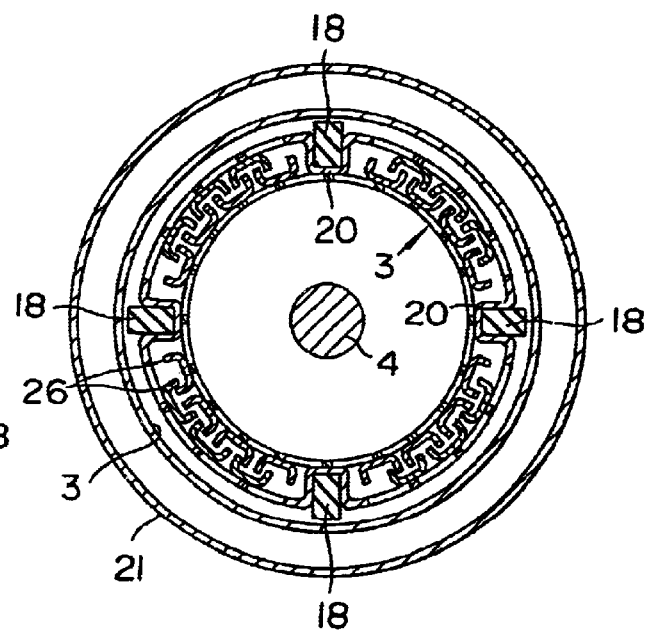

The method of this invention is characterized by cyclically using at least part of the extracted liquid in the thin-film type evaporating device or supplying a solution having lower viscosity than the extracted liquid to the raw material supplying inlet (1). When the extracted liquid is cyclically used, the extracted liquid may be temporarily stored in a storage tank (29) as illustrated in FIG. 7 and this storage tank may be utilized for the cyclic use mentioned above. It is further allowable to subject the extracted liquid in the storage tank (29) to a specific treatment such as thermal decomposition and thereafter put the treated liquid to cyclic use. Even when the extracted liquid is unusable in its unmodified form, the storage tank (29) is capable of adapting the liquid fit for cyclic use by giving it the treatment mentioned above. When the extracted liquid happens to contain such a high-boiling substance as the dimer of acrylic acid, for example, the effective utilization of the raw material can be materialized by using the storage tank (29) as a vessel for thermal decomposition and consequently decomposing the dimer and converting it into acrylic acid as a finished product. Incidentally, the temperature condition of the vessel for thermal decomposition may be properly selected to suit the characteristic properties of the easily polymerizable substance and the high-boiling substance contained therein. When the extracted liquid or a solution having lower viscosity than the extracted liquid is supplied to the extracted liquid discharging outlet (10) or when the solution mentioned above is supplied to the bearing part (15) with the object of preventing the bearing part (15) from drying or inducing polymerization, the solution which has been used therein is destined to form the extracted liquid from the outlet (10) mentioned above. In the calculation of the quantity of the wetting liquid mentioned above in this invention, therefore, the solution supplied as described above is to be included in the extracted liquid.

(12) Liquid Seal

This invention permits the liquid extracted from the recovering column disposed in the upper part of the thin-film type evaporating device to be used as the raw material for feeding. In the process for the production of acrylic acid, for example, the use of the thin-film type evaporating device as the re-boiler for the extracted liquid from the acrylic acid recovering column corresponds itself to the case. In this case, by circulating the distillate component at the vapor discharging outlet (2) to the recovering column (22) disposed in the upper part of the thin-film type evaporating device as illustrated in FIG. 7 and using the extracted liquid from the recovering column (22) as the raw material for feeding to the thin-film type evaporating device, it is made possible to recover the easily polymerizable substance as a product at the recovering column (22) and, at the same time, use the liquid extracted from the recovering column as the raw material for feeding to the thin-film type evaporating device, with the result that the yield of purification will be improved by the reclamation of the liquid extracted from the recovering column. Further, the efficiency of the purification of the easily polymerizable substance is enhanced because the evaporation in the thin-film type evaporating device proceeds very rapidly and the polymerization is effectively repressed.

Since the thin-film type evaporating device allows only a brief retention time, it is important that the device be fed with the raw material supplying liquid constantly in a fixed amount. If the raw material cannot be supplied in the fixed amount, the operation will be deprived of stability and the device will encounter such troubles as formation of polymer. This invention puts the liquid extracted from the liquid receiving part (12) to cyclic use also with the object of ensuring stable supply of the raw material. When the liquid extracted from the recovering column (22) is used as the raw material for feeding as mentioned above, there arises the possibility that the supply of the raw material in a fixed amount will not be accomplished. This failure may be logically explained by a supposition that a gas leaks into a line (23) starting from the recovering column (22) and returning to the thin-film type evaporating device and the ascent of this gas compels the liquid extracted from the recovering column to flow back. This invention, therefore, contemplates easily and stably supplying the raw material by sealing the pipe with the liquid extracted from the recovering column as illustrated in FIG. 7 or by supplying the liquid extracted from the recovering column under pressure to the thin-film type evaporating device.

Preferably, in this case, the sealing part (23) using the liquid extracted from the recovering column (22) is disposed in part of the pipe which interconnects the extracted liquid outlet of the recovering column (22) and the thin-film type evaporating device.

Such a liquid sealing part can be attained by disposing a projecting part arising from below the bottom part of the recovering column and reaching above the raw material supplying part of the thin-film type evaporating device in one part of the pipe interconnecting the extracted liquid outlet of the recovering column (22) and the thin-film type evaporating device and disposing in the projecting part a liquid reservoir to be filled with the liquid extracted from the recovering column (22). One example of this scheme is illustrated in FIG. 7. Alternatively, the supply of the liquid extracted from the recovering column under pressure to the thin-film type evaporating device as mentioned above may be fulfilled by furnishing the recovering column with a liquid level indicator capable of fixing the position (25, for example) of the liquid level of the bottoms in the recovery column at a fixed position in the recovering column (22) and, at the same time, disposing a pressure device in a part of the pipe interconnecting the outlet for the bottoms and the thin-film type evaporating device, and forcing the liquid extracted from the recovering column (22) under pressure to the thin-film type evaporating device. This invention particularly prefers the supply of the raw material to the thin-film type evaporating device to be implemented by forcing the extracted liquid under pressure. The reason for this preference is that the supply effected in this mode also allows a decrease in the retention time of the easily polymerizable substance within the recovering column.

The recovering column (22) which is connected to the thin-film evaporating device does not need to set any limit on such factors as the theoretical number of steps, the diameter of the recovering column, the choice as to the use of a filler, and the kind of the filler, if used at all. The liquid extracted from the recovering column is only required to contain an easily polymerizable substance.

EXPERIMENTS

Now, this invention will be specifically described below with reference to working examples.

EXAMPLE 1

Recovery of 2-ethylhexyl acrylate was carried out. A vertical thin-film type evaporating device was used which measured 1500 mm in inside diameter, used an evaporating heating surface with a surface roughness, Ry, of 3.2 and a wiper fixed by the pressure of a movable vane, and incorporated therein a cone having an angle of 50°, with a molecular oxygen supplying inlet provided in the periphery part of a mechanical seal and the welded part for the extracted liquid outlet chamfered.

First, as the raw material for feeding, a solution containing 80 wt. % of 2-ethylhexyl acrylate and 1 wt. % of acrylic acid was through in the thin-film type evaporating device at a rate of 1.8 m$^3$/Hr. The liquid extracted from the thin-film type evaporating device was introduced into storage tank and part of the liquid extracted from the storage tank was circulated to the thin-film type evaporating device. The molecular oxygen-containing gas was supplied to the thin-film type evaporating device at a rate of 2.6 Nm$^3$/Hr. As regards the conditions of the distillation, the temperature of the heating face was adjusted in the range of 110–130° C. and the pressure was at 10 Torrs.

In this case, the quantity of the liquid circulated from the storage tank to the thin-film type evaporating device was set at 3.8 m$^3$/Hr so as to fix the quantity of the wetting liquid per unit length relative to the quantity of the liquid extracted from the bottoms of the thin-film type evaporating device at 0.9 m$^3$/mHr. The quantity of the liquid extracted from the lower part of the thin-film type evaporating device was 4.1 m$^3$/Hr, the portion 0.3 m$^3$/Hr of which was discarded as waste liquid.

When the operation described above was continued for six months, it could be stably carried out without entailing such problem as polymerization.

Control 1

An operation of the thin-film type evaporating device was performed by following the procedure of Example 1 while omitting the circulation of the liquid from the storage tank to the thin-film type evaporating device and changing the quantity of the wetting liquid per unit length relative to the quantity of the liquid extracted from the lower part of the thin-film type evaporating device to 0.01 m$^3$/mHr.

When this operation was carried out, the portion of the thin-film type evaporating device which dried owing to the shortage of the quantity of the wetting liquid per unit length induced formation of a polymer. The polymer thus formed compelled the operation to be discontinued in five days.

Control 2

An operation performed by following the procedure of Example 1 while omitting the introduction of any oxygen. This operation had to be discontinued in two months.

EXAMPLE 2

In compliance with the process diagram illustrated in FIG. 7, a recovering column was disposed in the upper part of a thin-film type evaporating device and the liquid extracted from the recovering column was further used as the raw material for feeding. A projecting part was formed in a pipe rising from below the bottom part of the recovering column and reaching above the raw material supplying part of the thin-film type evaporating device to provide a liquid seal.

For the distillation in the recovering column, a distillation column measuring 1300 mm in inside diameter and incorporating therein 10 stepped sieve trays of stainless steel (SUS 316). Through the top of the column kept under pressure of 30 Torrs and at a temperature of 58° C., the raw material was supplied.

The vertical thin-film type evaporating device used herein measured 1500 mm in inside diameter, used an evaporating heating surface with a surface roughness, Ry, of 3.2 and a wiper fixed by the pressure of a movable vane, and incorporated therein a cone having an angle of 50°, with a molecular oxygen supplying inlet provided in the periphery part of a mechanical seal and the welded part for the extracted liquid outlet chamfered As the raw material for supplying, a solution containing 24 wt. % of acrylic acid and 56 wt. % of butyl acrylate was thrown into the recovering column at a rate of 4.6 m$^3$/Hr. The quantity of molecular oxygen gas supplied to the thin-film type evaporating device was set at 0.1 Nm$^3$/Hr.

In this case, the quantity of the liquid circulated from the storage tank to the thin-film type evaporating device was set at 3.4 m$^3$/Hr so as to fix the quantity of the wetting liquid per unit length relative to the quantity of the liquid extracted from the bottoms of the thin-film type evaporating device at 0.8 m$^3$/mHr. The quantity of the liquid extracted from the lower part of the thin-film type evaporating device was 4.0 m$^3$/Hr, the portion 0.6 m$^3$/Hr of which was discarded as waste liquid When this operation was continued for six month, the operation could be carried out stably without entailing such problem as polymerization.

Control 3

An operation was performed by following the procedure of Example 2 while omitting the disposition of a projecting part in a pipe rising from below the bottom part of the recovering column and reaching above the raw material supplying part of the thin-film type evaporating device thereby avoiding the provision of a liquid seal, the raw material could not be supplied in a fixed quantity and the thin-film type evaporating device suffered formation of polymer therein. Thus, the operation had to be discontinued in two months.

The entire disclosure of Japanese Patent Application No.11-116991 filed on Apr. 23, 1999 including specification, claims, drawing and summary are incorporated herein by reference in its entirety.

What is claimed is:

1. A method for preventing an easily polymerizable substance from being polymerized during distillation thereof in a thin-film evaporating device by supplying a solution of said easily polymerizable substance to an evaporating heating surface of said device by the centrifugal force of a stirring rotary shaft, comprising the steps of:

supplying a molecular oxygen-containing gas to the device and supplying condensate liquid obtained from a bottom of the device to feed a raw material inlet so that a quantity of a wetting liquid per unit length of the evaporating heating surface is in a range of 0.02–2 m$^3$/mHr.

2. A method of claim 1 further comprising the step of mixing a vapor of said easily polymerization substance generated in said thin-film type evaporating device during the distillation with said molecular oxygen-containing gas.

3. A method according to claim 2, wherein a quantity of oxygen gas in the supplied molecular oxygen-containing gas is in a range of 0.01–5 vol. %, based on a quantity of the vapor of said easily polymerizable substance generated in said thin-film type evaporating device during the distillation.

4. A method according to claim 2, wherein said molecular oxygen-containing gas to be mixed with said vapor of easily polymerizable substance is supplied to the periphery of a mechanical seal in said thin-film evaporating device.

5. A method according to claim 1, wherein said molecular oxygen-containing gas is supplied through a molecular oxygen-containing gas supply pipe or a molecular oxygen-containing gas inlet disposed through said thin-film evaporating device.

6. A method according to claim 1, wherein said thin-film type evaporating device composes a bearing part for said stirring rotary shaft, said condensate liquid is supplied to said bearing of the device.

7. A method according to claim 1, wherein part or the whole of the surface of said thin-film evaporating device exposed to said easily polymerizable substance has a surface roughness, Ry, specified in Japanese Industrial Standard JIS B 0601, of not more than 12.5 $\mu$m.

8. A method according to claim 1, wherein the thin film evaporating device comprises a vertical thin-film evaporating device to form a thin film on said evaporating heating surface by the use of a wiper fixed to a periphery of a rotor connected to beams projecting radially from said stirring rotary shaft, said wiper is fixed to said rotor with a movable vane supporting rod.

9. A method according to claim 1, wherein the thin film evaporating device comprises a vertical thin-film evaporating device which forms at the bottom thereof a cone converging from the bottom of said thin-film evaporating device toward a discharge outlet for receiving the condensate liquid and an angle formed between generating lines of said cone is in a range of 40–70°.

10. A method according to claim 1, wherein said thin-film evaporating device has a discharge outlet for receiving said condensate liquid projected outwardly from said thin-film type evaporating device and connected thereto by welding and the welded part is chamfered.

11. A method according to claim 1, wherein said thin film evaporating device comprises a horizontal thin-film evaporating device which has a downward gradient of said evaporating heating surface of not less than $\frac{1}{200}$.

12. A method according to claim 1, wherein said easily polymerizable substance is (meth)acrylic acid and/or an ester thereof and the quantity of the wetting liquid per unit length is in the range of 0.2–2 m³/mHr.

13. A method of claim 1 for preventing an easily polymerizable substance from being polymerized during distillation thereof in a thin-film evaporating device further comprising the steps of:

supplying a distillate component at a vapor outlet to a recovering column disposed in an upper part of the thin-film evaporating device and, at the same time, using at least part of a condensate liquid of the recovering column as feed raw material for the thin-film evaporating device; and disposing a liquid sealing part utilizing the condensate liquid of the recovering column in a part of a pipe interconnecting a condensate outlet of the recovering column and the thin-film evaporating device.

14. A method of claim 1 for preventing an easily polymerizable substance from being polymerized during distillation thereof in a thin-film evaporating device further comprising the steps of:

supplying a distillate component at a vapor outlet to a recovering column disposed in an upper part of the thin-film evaporating device and, at the same time, using at least part of a condensate liquid of the recovering column as feed raw material for the thin-film evaporating device, wherein the condensate liquid of the recovering column is supplied under pressure to the thin-film evaporating device.

15. A method for preventing an easily polymerizable substance from being polymerized during distillation thereof in a thin-film evaporating device by supplying a solution of said easily polymerizable substance to an evaporating heating surface of said device by the centrifugal force of a stirring rotary shaft, comprising the steps of:

supplying a molecular oxygen-containing gas to the device; and supplying a solution having a lower viscosity than a condensate liquid from a bottom of the device to a feed raw material inlet so that a quantity of a wetting liquid per unit length of the evaporating heating surface is in a range of 0.02–2 m³/mHr.

16. The method of claim 15 further comprising the step of mixing a vapor of said easily polymerization substance generated in said thin-film type evaporating device during the distillation with said molecular oxygen-containing gas.

17. A method according to claim 16, wherein a quantity of oxygen gas in the supplied molecular oxygen-containing gas is in a range of 0.01–5 vol. %, based on a quantity of the vapor of said easily polymerizable substance generated in said thin-film type evaporating device during the distillation.

18. A method according to claim 16, wherein said molecular oxygen-containing gas to be mixed with said vapor of easily polymerizable substance is supplied to the periphery of a mechanical seal in said thin-film type evaporating device.

19. A method according to claim 15, wherein said molecular oxygen-containing gas is supplied through a molecular oxygen-containing gas supply pipe or a molecular oxygen-containing gas inlet disposed through said thin-film type evaporating device.

20. A method according to claim 15, wherein said thin-film type evaporating device composes a bearing part for said stirring rotary shaft, said solution having a lower viscosity than said condensate liquid is supplied to said bearing of the device.

21. A method according to claim 15, wherein part or the whole of the surface of said thin-film evaporating device exposed to said easily polymerizable substance has a surface roughness, Ry, defined as in a rough curved line which is set on a horizontal line and cut off in a standard length along the horizontal line, the height of a top of the rough from the horizontal line and the depth of a bottom of the rough from the horizontal line, of not more than 12.5 µm.

22. A method according to claim 15, wherein the thin film evaporating device comprises a vertical thin-film evaporating device to form a thin film on said evaporating heating surface by the use of a wiper fixed to a periphery of a rotor connected to beams projecting radially from said stirring rotary shaft, said wiper is fixed to said rotor with a movable vane supporting rod.

23. A method according to claim 15, wherein the thin film evaporating device comprises a vertical thin-film evaporating device which forms at the bottom thereof a cone converging from the bottom of said thin-film evaporating device toward a discharge outlet for receiving the condensate liquid and an angle formed between generating lines of said cone is in a range of 40–70°.

24. A method according to claim 15, wherein said thin-film evaporating device has a discharge outlet for receiving said condensate liquid projected outwardly from said thin-film type evaporating device and connected thereto by welding and the welded part is chamfered.

25. A method according to claim 15, wherein said thin film evaporating device comprises a horizontal thin-film evaporating device which has a downward gradient of said evaporating heating surface of not less than 1/200.

26. A method according to claim 15, wherein said easily polymerizable substance is (meth)acrylic acid and/or an ester thereof and the quantity of the wetting liquid per unit length is in the range of 0.2–2 m³/mHr.

27. A method according to claim 15, wherein said solution having lower viscosity than said condensate liquid is supplied to an outlet for said condensate liquid in the device and said solution and said condensate liquid is supplied to said feed raw material inlet.

* * * * *